United States Patent [19]

Sakuma

[11] Patent Number: 5,724,035
[45] Date of Patent: Mar. 3, 1998

[54] METHOD OF CORRECTING SIGNALS FOR ENCODER AND APPARATUS FOR SAME

[75] Inventor: Hirokazu Sakuma, Tokyo, Japan

[73] Assignee: Mitsubishi Denki Kabushiki Kaisha, Tokyo, Japan

[21] Appl. No.: 719,635

[22] Filed: Sep. 25, 1996

[30] Foreign Application Priority Data

Mar. 29, 1996 [JP] Japan .................. 8-077168

[51] Int. Cl.⁶ ................................. H03N 1/06
[52] U.S. Cl. ........................... 341/120; 341/116
[58] Field of Search ..................... 341/119, 139, 341/115, 112, 120, 116, 118, 110

[56] References Cited

U.S. PATENT DOCUMENTS

| | | | |
|---|---|---|---|
| 4,472,669 | 9/1984 | Denham et al. | 341/115 |
| 5,052,021 | 9/1991 | Goto et al. | 375/76 |
| 5,179,379 | 1/1993 | Allen et al. | 341/118 |
| 5,182,558 | 1/1993 | Mayo | 341/118 |
| 5,210,712 | 5/1993 | Saito | 364/825 |
| 5,365,190 | 11/1994 | Yu et al. | 330/149 |

FOREIGN PATENT DOCUMENTS 61-20868   1/1986   Japan .

*Primary Examiner*—Jeffrey A. Gaffin
*Assistant Examiner*—Peguy JeanPierre
*Attorney, Agent, or Firm*—Sughrue, Mion, Zinn, Macpeak & Seas, PLLC

[57] ABSTRACT

The encoder provided by the present invention computes an obtains a difference value between a maximum value and a minimum value of a simulated sinusoidal signal from the signal detecting section, computes an amplitude of said simulated sinusoidal signal in the amplitude computing section according to the difference value, decides an optimal reference voltage for an A/D converter or an optimal amplification factor and an optimal reference voltage for a signal amplifier for simulated sinusoidal signals, and sets a reference voltage for the A/D converter or an amplification factor and a reference voltage for the signal amplifier according to the optimal values.

16 Claims, 7 Drawing Sheets

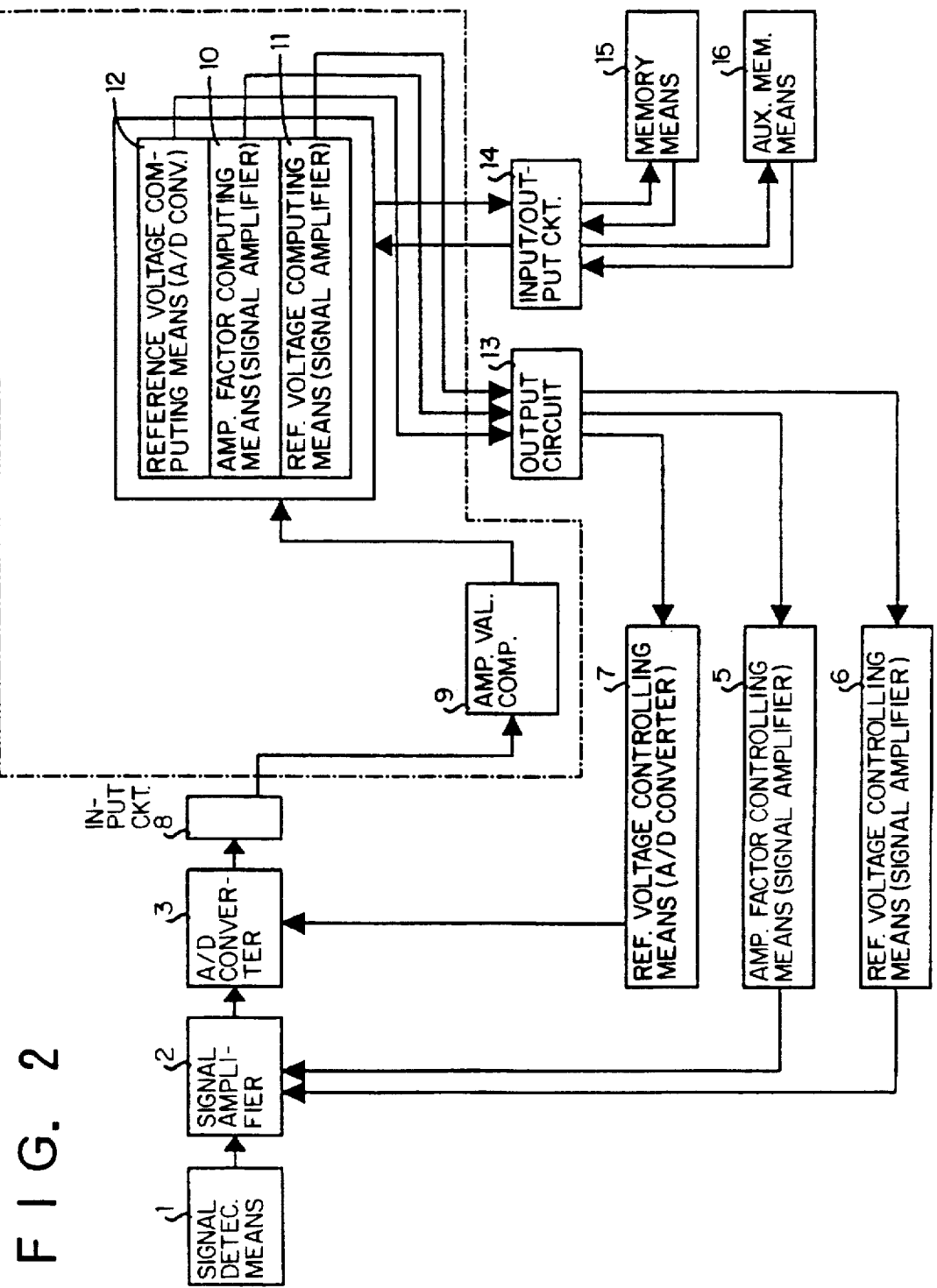
F I G. 2

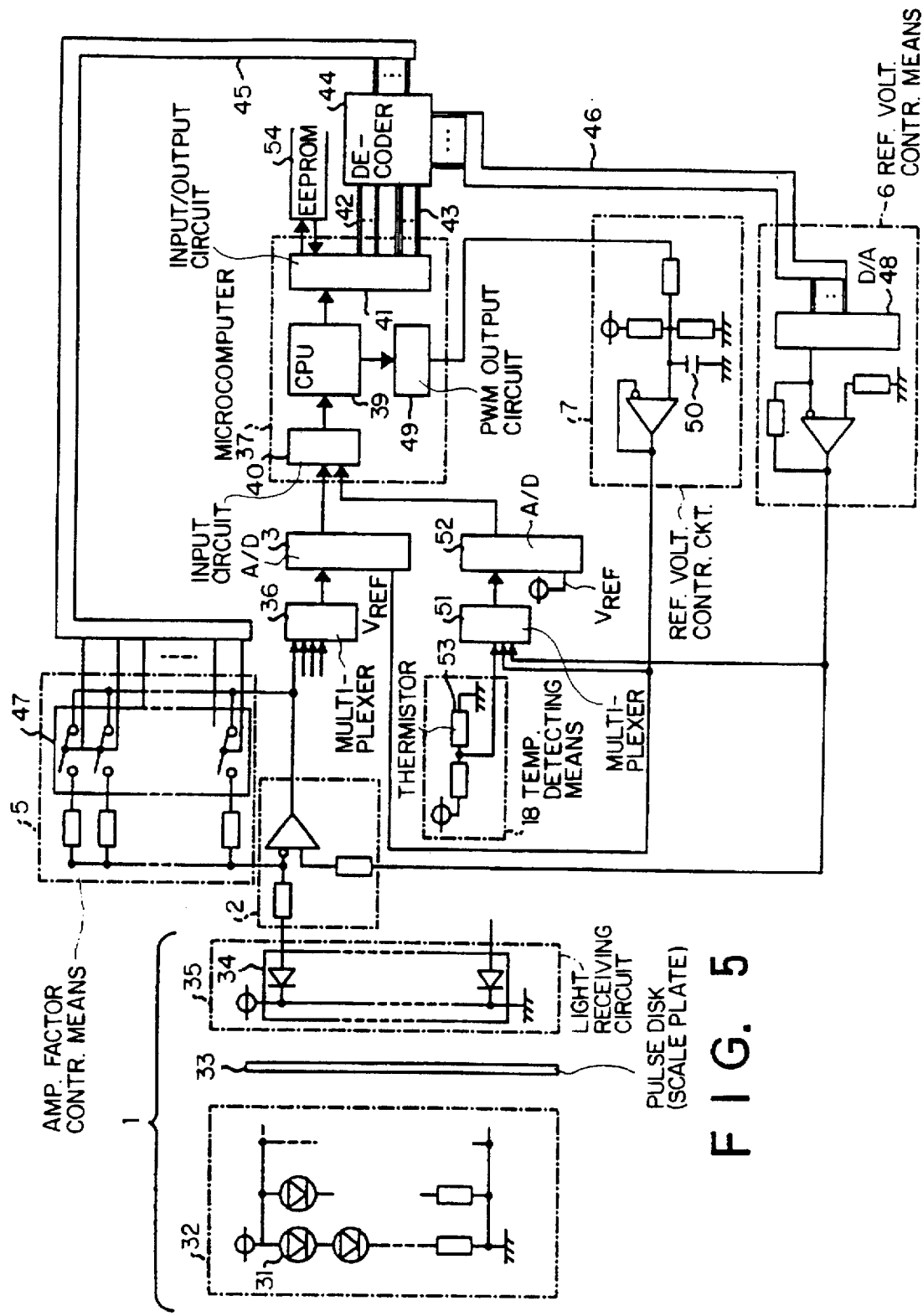
F I G. 5

METHOD OF CORRECTING SIGNALS FOR ENCODER AND APPARATUS FOR SAME

FIELD OF THE INVENTION

The present invention relates to a method of correcting signals for an encoder and an apparatus for the same, and more particularly, to a method of correcting signals for an encoder for preparing simulated sinusoidal signals by means of movement of a scale plate such as a pulse plate in a signal detecting section and detecting a position by subjecting the signal to A/D conversion as well as to an apparatus for the same.

BACKGROUND OF THE INVENTION

FIG. 7 shows an encoder based on a conventional technology. This encoder is one based on an optical system, and comprises a light emitting circuit 100 having a light emitting element 101 such as an LED; a light receiving circuit 102 having a light receiving element 103; a signal detecting section 105 comprising the light emitting circuit 100, the light receiving circuit 102, and a scale plate 104 therebetween; an amplifier 106; a multiplexer 107; an A/D converter 108; and a microcomputer 111 for a signal processing including therein an input circuit 109 and a CPU 110. A volume 112 for adjusting a quantity of a light emitted from the light emitting element 101 is provided in the light emitting circuit 100, and volumes 113, 114 each for adjusting an amplification factor and a reference voltage are provided in the amplifier 106 respectively.

The encoder generates a plurality of simulated sinusoidal signals by means of movement of the scale plate 104. A simulated sinusoidal signal is amplified by the amplifier 106, the signal selected by the multiplexer 107 is converted to a digital value by the A/D converter 108, and is received by the microcomputer 111. The microcomputer 111 detects a position by computing the digital signal from the A/D converter.

An amplification factor and a reference voltage of simulated sinusoidal signals are adjusted with each of the volumes 113 and 114 in the amplifier 106 when the encoder is assembled, and from the process on, a value is fixed to a specified value. An amplitude range of the signal to be adjusted with the volumes 113 and 114 is decided according to a fixed reference voltage value Vref for the A/D converter 108, and the reference voltage value Vref is decided according to a power voltage.

When an amplitude of the simulated sinusoidal signal (a difference value between a maximum value and a minimum value of the simulated sinusoidal signal) varies, a difference is generated between data for A/D conversion, and as a result an error is generated between positional data computed by the microcomputer.

In the encoder based on the conventional technology, an amplification factor is adjusted with the volume only when the encoder is assembled, and a volume value is fixed thereafter, but, generally, an amplitude of a simulated sinusoidal signal from the signal detecting section is not constant all the time, and varies from time to time according to changes of a detected position, changes of a temperature, changes of a speed and changes associated with passage of time, so that an A/D conversion value of a simulated sinusoidal signal is changed, and for this reason an accurate position can not be detected. In addition, adjustment of the amplification factor with a volume is extremely difficult, so that it requires a long period of time.

SUMMARY OF THE INVENTION

It is an object of the present invention to provide a method of correcting signals for an encoder in which an appropriate amplification factor and reference voltage for an amplifier or a suitable reference voltage for an A/D converter each corresponding to fluctuations of an amplitude of the simulated sinusoidal signal from the signal detecting section are automatically set, and an accurate position can be detected at any time, as well as to provide an apparatus for the same.

In the method of correcting signals for an encoder according to the present invention, an amplitude for the simulated sinusoidal signal from the signal detecting section is detected, and a reference voltage for the A/D converter or an amplification factor and a reference voltage for the amplifier are automatically set to optimal values according to the amplitude.

In the method of correcting signals for an encoder according to the present invention, as soon as an amplitude for the simulated sinusoidal signal is detected anew, an optimal reference voltage for the A/D converter or an optimal amplification factor and an optimal reference voltage for the amplifier are updated to new values.

In the method of correcting signals for an encoder according to the present invention, a reference voltage for the A/D converter or an amplification factor and a reference voltage for the amplifier are set according to the initial values stored in the memory means until an amplitude of the simulated sinusoidal signal is detected after power is turned ON, and a reference voltage for the A/D converter or an amplification factor and a reference voltage for the amplifier are temporarily and automatically set thereto even immediately after power is turned ON.

In the method of correcting signals for an encoder according to the present invention, a reference voltage for the A/D converter or an amplification factor and a reference voltage for the amplifier are temporarily and automatically set according to the initial values stored in the memory means as well as to the difference value under an amplitude for the simulated sinusoidal signal detected anew until an amplitude of the simulated sinusoidal signal is detected after power is turned ON.

In the method of correcting signals for an encoder according to the present invention, the reference voltage for the A/D converter or the amplification factor and the reference voltage for the amplifier are corrected and set according to any of the temperature compensated values corresponding to a detected temperature at the moment until an amplitude of the simulated sinusoidal signal is detected anew, for instance, after power is turned ON.

In the method of correcting signals for an encoder according to the present invention, the reference voltage for the A/D converter or the amplification factor and the reference voltage for the amplifier are corrected and set according to any of the speed compensated values corresponding to a detected speed at the moment until an amplitude of the simulated sinusoidal signal is detected anew, for instance, after power is turned ON.

In the method of correcting signals for an encoder according to the present invention, the reference voltage for the A/D converter or the amplification factor and the reference voltage for the amplifier are corrected and set according to any of the position compensated values corresponding to a detected position at the moment until an amplitude of the simulated sinusoidal signal is detected anew, for instance, after power is turned ON.

In the method of correcting signals for an encoder according to the present invention, a position for A/D conversion of a next simulated sinusoidal signal is estimated according to the position and the speed, and a reference voltage for the A/D converter or an amplification factor and a reference voltage for the amplifier in next A/D conversion are corrected and set according to the position compensated value at the estimated position in preparation for the next A/D conversion.

In the signal correcting apparatus for an encoder according to the present invention, an amplitude value computing means computes an amplitude for the simulated sinusoidal signal according to a difference value between a maximum value and a minimum value of the simulated sinusoidal signal, a computing means computes an optimal reference value for the A/D converter or an optimal amplification factor and an optimal reference voltage for the simulated sinusoidal signal according to the amplitude computed by the amplitude value computing means, and a control means automatically sets a reference voltage for the A/D converter or an amplification factor and a reference voltage for the amplifier to optimal values according to these computed values.

In the signal correcting apparatus for an encoder according to the present invention, as soon as an amplitude for the simulated sinusoidal signal is detected anew, the computing means computes again an optimal reference voltage for the A/D converter or an optimal amplification factor and an optimal reference voltage for the amplifier, and these new values are updated to new ones.

In the signal correcting apparatus for an encoder according to the present invention, a reference voltage for the A/D converter or an amplification factor and a reference voltage for the amplifier are temporarily and automatically set according to the initial values stored in the memory means until an amplitude of the simulated sinusoidal signal is detected after power is turned ON.

In the signal correcting apparatus for an encoder according to the present invention, a reference voltage for the A/D converter or an amplification factor and a reference voltage for the amplifier are temporarily and automatically set according to the initial values stored in the memory means as well as to the difference value under an amplitude for the simulated sinusoidal signal detected anew until an amplitude of the simulated sinusoidal signal is detected after power is turned ON.

In the signal correcting apparatus for an encoder according to the present invention, the reference voltage for the A/D converter or the amplification factor and the reference voltage for the amplifier are corrected and set according to any of the temperature compensated values corresponding to a detected temperature at the moment until an amplitude of the simulated sinusoidal signal is detected anew, for instance, after power is turned ON.

In the signal correcting apparatus for an encoder according to the present invention, the reference voltage for the A/D converter or the amplification factor and the reference voltage for the amplifier are corrected and set according to any of the speed compensated values corresponding to a detected speed at the moment until an amplitude of the simulated sinusoidal signal is detected anew, for instance, after power is turned ON.

In the signal correcting apparatus for an encoder according to the present invention, the reference voltage for the A/D converter or the amplification factor and the reference voltage for the amplifier are corrected and set according to any of the position compensated values corresponding to a detected position at the moment until an amplitude of the simulated sinusoidal signal is detected anew, for instance, after power is turned ON.

In the signal correcting apparatus for an encoder according to the present invention, a position for A/D conversion of a next simulated sinusoidal signal is estimated according to the position and the speed, and a reference voltage for the A/D converter or an amplification factor and a reference voltage for the amplifier in next A/D conversion are corrected and set according to the position compensated value at the estimated position for the next A/D conversion.

Other objects and features of this invention will become understood from the following description with reference to the accompanying drawings.

BRIEF DESCRIPTION OF THE DRAWINGS

FIG. 2 is a block diagram showing Embodiment 2 of the encoder including therein the signal correcting apparatus according to the present invention;

FIG. 5 is an electric circuit diagram showing Embodiment 5 of the encoder including therein the signal correcting apparatus according to the present invention;

DESCRIPTION OF THE PREFERRED EMBODIMENT

Detailed description is made hereinafter for embodiments of the present invention with reference to the related drawings.

Figure 1:
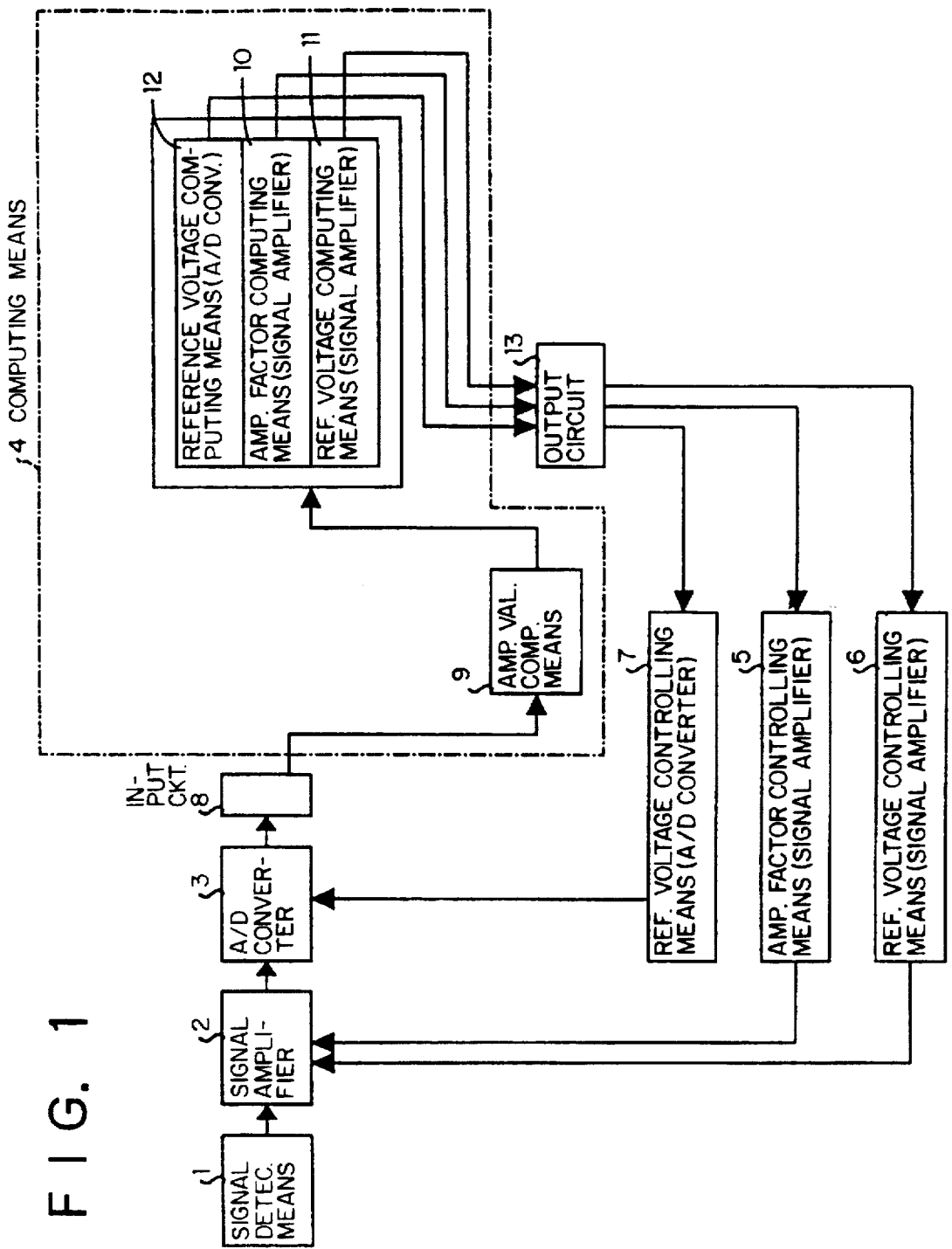
FIG. 1 is a block diagram showing Embodiment 1 of an encoder including therein a signal correcting apparatus according to the present invention.

FIG. 1 shows Embodiment 1 of the encoder including therein the signal correcting apparatus according to the present invention. In FIG. 1, designated at the reference numeral 1 is a signal detecting means, at 2 a signal amplifier, at 3 an A/D converter, and at 4 a computing means respectively.

The signal detecting means 1 is the same as that (a signal detecting section 105) based on the conventional type, and generates simulated sinusoidal signals by means of movement of a scale plate which is not shown herein or the like.

The signal amplifier 2 is an amplifier for amplifying simulated sinusoidal signals outputted from the signal detecting means 1, and an amplification factor is variably set by an amplification factor controlling means 5 and a reference voltage is variably set by a reference voltage controlling means 6.

The A/D converter 3 is one for converting the simulated sinusoidal signal amplified by the signal amplifier 2 to a digital value, and in which a range of converting a voltage is changed by a reference voltage controlling means 7.

The computing means 4 comprises an amplitude value computing means 9, an amplification factor computing means 10 and a reference voltage computing means 11 each for the signal amplifier 2, and a reference voltage computing means 12 for the A/D converter 3.

The amplitude value computing means 9 receives the digital signal subjected to A/D-conversion by the A/D converter 3 through an input circuit 8, and computes an amplitude value of the signal according to the digital value. An amplitude value (amplitude) of a signal herein indicates a difference value between a maximum value and a maximum value of a simulated sinusoidal signal.

The amplification factor computing means 10 and reference voltage computing means 11 for the signal amplifier 2 and the reference voltage computing means 12 for the A/D converter 3 compute an amplification factor and a reference voltage for the signal amplifier 2 and a reference voltage for the A/D converter 3 according to amplitude values each of a signal computed by the amplitude value computing means 9 respectively, and each of the computed results is outputted to the amplification factor controlling means 5 and reference voltage controlling means 6, 7 through an output circuit 13.

In the encoder having the configuration described above, a simulated sinusoidal signal generated in the signal detecting means 1 and amplified by the signal amplifier 2 is converted to a digital value by the A/D converter 3, and an amplitude value of the simulated sinusoidal signal is detected by the amplitude value computing means 9.

The amplitude is sent to each of the amplification factor computing means 10 and reference voltage computing means 11, 12, and the amplification factor computing means 10 computes an optimal amplification factor for the signal amplifier 2, the reference voltage computing means 11 computes an optimal reference voltage for the signal amplifier 2, and the reference voltage computing means 12 computes an optimal reference voltage for the A/D converter 3 respectively.

An optimal amplification factor computed by the amplification factor computing means 10 is received by the amplification factor controlling means 5, and the amplification factor controlling means 5 sets an amplification factor for the signal amplifier 2 to the optimal amplification factor.

An optimal reference voltage computed by the reference voltage computing means 11 is received by the reference voltage controlling means 6, and the reference voltage controlling means 6 sets a reference voltage for the signal amplifier 2 to the optimal value.

An optimal reference voltage computed by the reference voltage computing means 12 is received by the reference voltage controlling means 6, and the reference voltage controlling means 6 sets a reference voltage for the A/D converter 3 to the optimal value.

With this feature, the amplification factor and reference voltage for the signal amplifier 2, and the reference voltage for the A/D converter 3 each are automatically set to optimal set values respectively, so that each of accurate positions can be detected.

It should be noted that, if an amplitude for the simulated sinusoidal signal is computed anew by means of movement of the scale plate in the signal detecting means 1, the amplification factor computing means 10 and reference voltage computing means 11, 12 each compute again an optimal amplification factor for the signal amplifier 2, and each of optimal reference voltages for the signal amplifier 2 as well as for the A/D converter 3 respectively, whereby the set values each of an amplification factor and a reference voltage for the signal amplifier 2 and of a reference voltage for the A/D converter 3 are updated to optimal values each suited to the current operating environment.

With this feature, a furthermore accurate position can be detected in accordance with changes of a speed and changes of a temperature.

It should be noted that both of the amplification factor and reference voltage for the signal amplifier 2 and of the reference voltage for the A/D converter 3 are not always required to be variably set as described above, and at least one of them may be variably set. This condition is also required for embodiments described below.

FIG. 2 shows Embodiment 2 of the encoder including therein the signal correcting apparatus according to the present invention. In FIG. 2, the same reference numerals are assigned to the portions corresponding to those in FIG. 1, and description thereof is omitted herein.

In this embodiment, a memory means 15 which can store and protect data is connected to the computing means 4 through an input/output circuit 14. The memory means 15 erasably stores an optimal amplification factor for the signal amplifier 2 and optimal reference voltages for the signal amplifier 2 and for the A/D converter 3 each computed by the amplification factor computing means 10 as well as by the reference voltage computing means 11 and 12.

In a case where the memory means 15 is provided in the apparatus, an amplitude of a simulated sinusoidal signal generated by the signal detecting means 1 by test-rotating a scale plate in the signal detecting means 1 is obtained when an encoder is assembled and adjusted, and an optional amplification factor and an optimal reference voltage for the signal amplifier 2 and an optimal reference voltage for the A/D converter 3 are computed by each of the computing means 10, 11, and 12 according to the obtained amplitude values, and these set values are stored in the memory means 15 as initial values.

When power is turned ON, the set values (initial values) are read out from the memory means 15, and each of these set values is set by each of the controlling means 5, 6, and 7, so that a reference voltage for the A/D converter 3 and an amplification factor and a reference voltage for the signal amplifier 2 are temporarily and automatically set according to the initial values stored in the memory means 15 until an amplitude for the simulated sinusoidal signal is detected after power is turned ON.

With this feature, an accurate position can be detected in an initial stage after power is turned ON even before an amplitude of a simulated sinusoidal signal is detected, and the need for adjusting operation with a volume can be eliminated.

As shown in FIG. 2, an auxiliary memory means 16 is provided in the apparatus, and in a case where a new set value obtained from the amplitude of the simulated sinusoidal signal detected during the operation is different from the set value (initial value) written in the memory means 15, the difference therebetween is stored in the auxiliary memory means 16, then each of the set values is read out from the memory means 15 or auxiliary memory means 16 after power is turned ON, a dynamic range from the initial value can also be corrected by adding the set values.

In this case, a reference voltage for the A/D converter 3 and an amplification factor and a reference voltage for the signal amplifier 2 are temporarily and automatically set according to the initial value stored in the memory means 15 and the difference value under the amplitude of the simulated sinusoidal signal detected anew until an amplitude of the simulated sinusoidal signal is detected after power is turned ON.

With this feature, an accurate position can be detected in association with changes of the initial value from a point of time immediately after power is turned ON.

Figure 3:
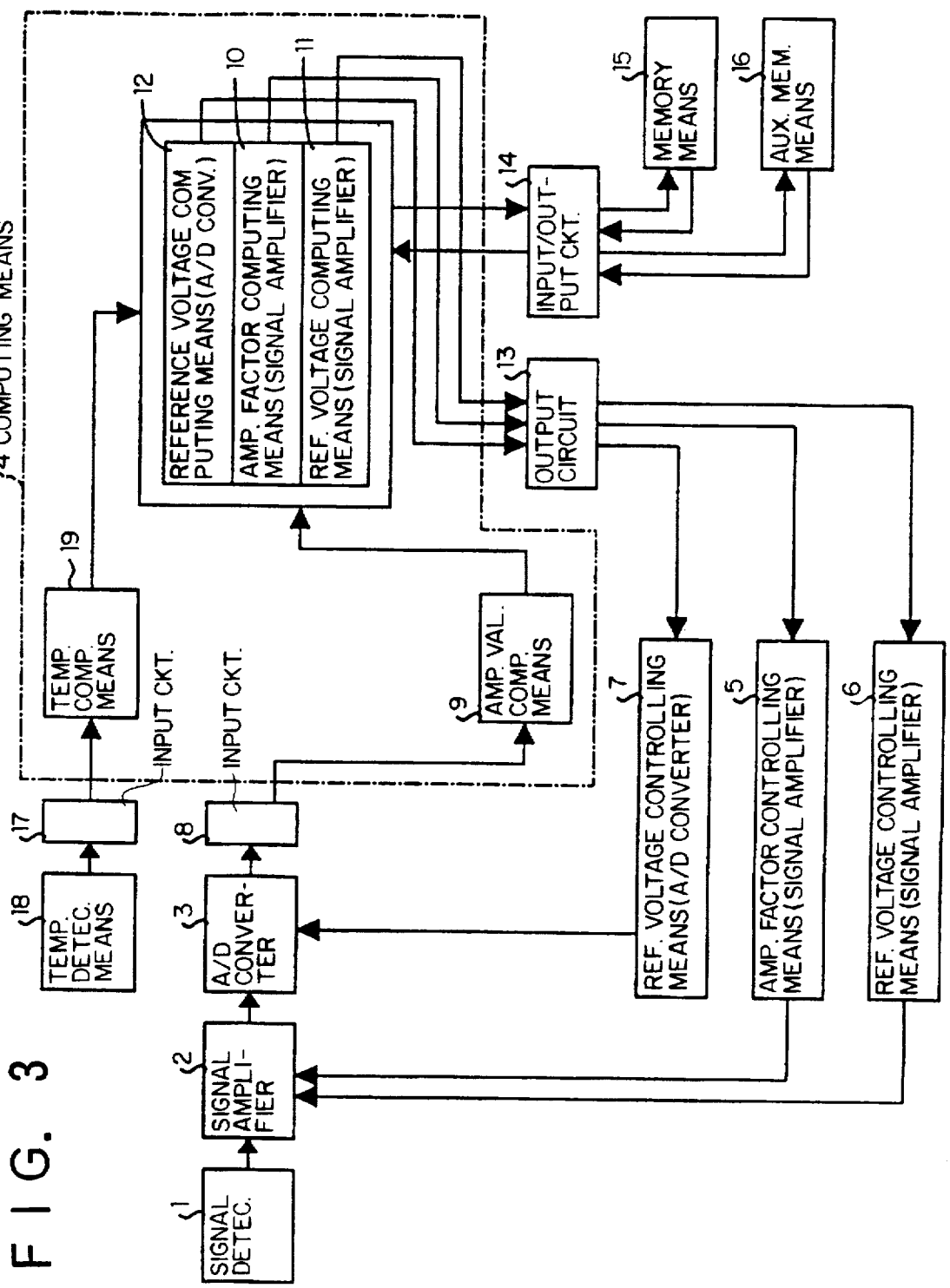
FIG. 3 is a block diagram showing Embodiment 3 of the encoder including therein the signal correcting apparatus according to the present invention.

FIG. 3 shows Embodiment 3 of the encoder including therein the signal correcting apparatus according to the present invention. In FIG. 3, the same reference numerals are assigned to the portions corresponding to those in FIG. 2, and description thereof is omitted herein.

In this embodiment, a temperature detecting means 18 is connected to the computing means 4 through an input circuit 17, and a temperature computing means 19 for computing a temperature in an environment according to a detected signal outputted from the temperature detecting means 18 is also added to the computing means 4. In this case, a temperature under operation is detected by the temperature detecting means 18, the temperature is monitored by the temperature computing means 19, each of optimal set values for the amplification factor and the reference voltage is obtained under each temperature by each of the computing means 10, 11, and 12, and a difference value (temperature compensated value) between the optimal set values for the amplification factor and reference voltage each corresponding to the temperature and the stored value (initial value) in the memory means 15 is stored in the auxiliary memory means 16 at each temperature.

In the embodiment, a temperature is detected by the temperature detecting means 18 when power is turned ON, and a difference between the initial value and the set value due to fluctuation of a temperature can be corrected by using the difference value stored in the auxiliary memory means 16.

For this reason, a reference voltage for the A/D converter 3 and an amplification factor and a reference voltage for the signal amplifier 2 are temporarily and automatically set according to the initial value stored in the memory means 15 as well as to the temperature compensated value corresponding to the detected temperature at the moment until an amplitude value of the simulated sinusoidal signal is detected after power is turned ON.

With this feature, an accurate position can be detected without being affected by any change of a temperature from a point of time immediately after power is turned ON.

In a case where an amplitude value of the detected signal can not be detected during operations and fluctuation of a temperature occurs under a state in which a new value can not be obtained, the difference value corresponding to the current detected temperature is read out from the auxiliary memory means 16, and the set values for the amplification factor or the reference voltage described above are corrected according to a change of the temperature.

With this feature, an accurate position can be detected in association with fluctuations of a temperature even when a new set value can not be obtained.

Figure 4:
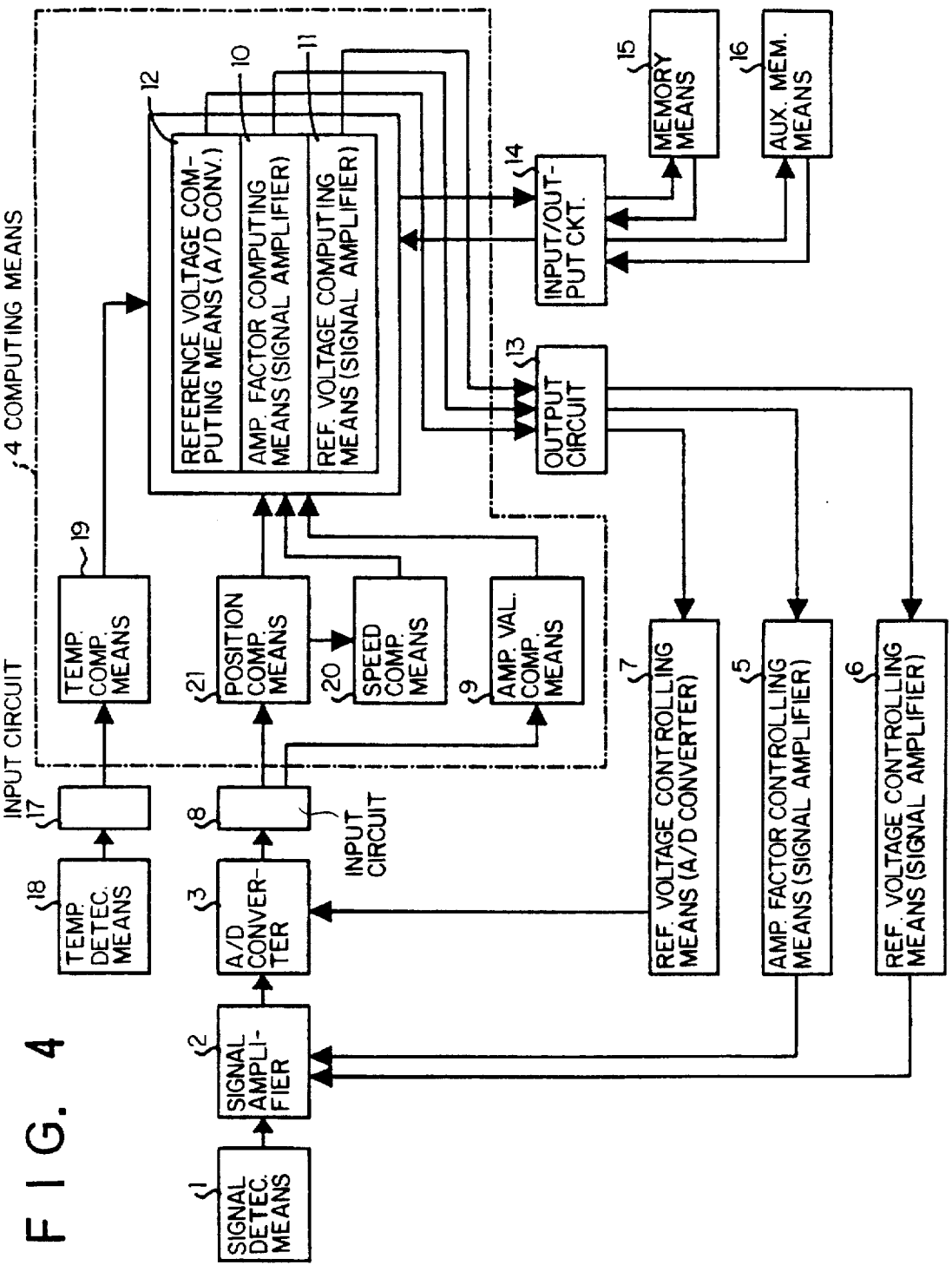
FIG. 4 is a block diagram showing Embodiment 4 of the encoder including therein the signal correcting apparatus according to the present invention.

FIG. 4 shows Embodiment 4 of the encoder including therein the signal correcting apparatus according to the present invention. In FIG. 4, the same reference numerals are assigned to the portions corresponding to those in FIG. 3, and description thereof is omitted herein.

In this embodiment, optimal set values for an amplification factor and a reference voltage are obtained by each of the computing means 10, 11, 12 at each speed computed by a speed computing means 20 provided in the computing means 4, and a difference value (speed compensated value) between optimal set values for the amplification factor and reference voltage corresponding to the speed and the stored values (initial values) in the memory means 15 are stored in the auxiliary memory means 16 at each speed.

Optimal values for the amplification factor and reference voltage are obtained at each position computed by a position computing means 21 provided in the computing means 4, and a difference value (position compensated value) between the optimal values of the amplification factor and reference voltage corresponding to the position and the stored value in the memory means 15 is stored in the auxiliary memory means 16 at each detected position.

In this embodiment, in a case where a new set value for an amplification factor or a reference voltage is not obtained at each speed, the difference value corresponding to the current detected speed is read out from the auxiliary memory means 16, and a set value for the amplification factor or the reference voltage is corrected according to a change of the speed.

For this reason, a reference voltage for the A/D converter 3 and an amplification factor and a reference voltage for the signal amplifier 2 are corrected according to the speed compensated value corresponding to the detected speed at the moment until an amplitude value for the simulated sinusoidal signal is detected after, for instance, power is turned ON.

With this feature, an accurate position can be detected in association with a change of a speed from a point of time immediately after power is turned ON.

Immediately after operation is started and during the operation, a difference value for an amplification factor and a reference voltage according to each of detected positions are read out from the auxiliary memory means 16, and each of the set values are corrected according to each of the detected positions.

For this reason, a reference voltage for the A/D converter 3 and an amplification factor and a reference voltage for the signal amplifier 2 are corrected according to the position compensated value corresponding to the detected speed at the moment until an amplitude value for the simulated sinusoidal signal is detected after, for instance, power is turned ON.

With this feature, an accurate position can be detected in association with a change of a position from a point of time immediately after power is turned ON.

Also, in this case, a position for next A/D conversion is estimated according to a speed detected by the speed computing means 20 as well as to a position detected by the position computing means 21, and set values for the amplification factor and reference voltage described above can previously be changed and set in preparation for next A/D conversion. Namely, a reference voltage for the A/D converter 3 and an amplification factor and a reference voltage for the signal amplifier 2 for next A/D conversion can be corrected according to the position compensated value at the estimated position in preparation for next A/D conversion.

With this feature, a furthermore accurate position can be detected at each position.

FIG. 5 shows an example of an electric circuit for the encoder including therein the signal correcting apparatus according to the present invention. In FIG. 5, the same reference numerals are also assigned to the portions corresponding to those in FIG. 1 to FIG. 4, and description thereof is omitted herein.

The signal detecting means 1 comprises a light emitting circuit 32 having a light emitting element (LED) 31; a pulse disk 33 (scale plate); and a light receiving circuit 35 having a light receiving element 34.

A simulated sinusoidal signal generated by the light receiving circuit 35 according to rotation of the pulse disk 33 is amplified by the signal amplifier 2, passes through a multiplexer 36, is converted to a digital value by the A/D converter, and is received by a CPU 39 in a microcomputer 37 through an input circuit 40.

The CPU 39 computes an optimal amplification factor and an optimal reference voltage for the signal amplifier 2 and an optimal reference voltage for the A/D converter 3 respectively, sends the computed result of the optimal amplification factor and optimal reference voltage for the signal amplifier 2 from an input/output circuit 41 to a decoder 44 through buses 42, 43, and the decoder 44 sends the computed result of the optimal amplification factor to the amplification factor controlling means 5 according to an amplification factor setting bus 45. The decoder 44 also sends the computed result of the optimal reference voltage to the reference voltage controlling means 6 through a reference voltage setting bus 46.

The amplification factor controlling means 5 is a switching system according to an analog switch 47, and sets an amplification factor of the signal amplifier 2 according to an optimal amplification factor computed by the CPU 39.

The reference voltage controlling means 6 has a D/A converter 48, converts a digital signal indicating a set value of an optimal reference voltage sent according to the reference voltage setting bus 46 to an analog value, and sets a reference voltage of the signal amplifier 2 to the optimal reference voltage.

An optimal reference voltage of the A/D converter 3 computed by the CPU 39 is transferred as a PWM signal from a PWM output circuit 49 to the reference voltage controlling circuit 7.

The reference voltage controlling circuit 7 includes a capacitor 50 for smoothing a PWM signal and sets a reference voltage of the signal amplifier 2 according to the optimal reference voltage computed by the CPU 39.

A reference voltage for the A/D converter 3 and a reference voltage for the signal amplifier 2 are fed back to the CPU 39 through the multiplexer 51 and A/D converter 52.

The temperature detecting means 18 is a temperature detector using a thermistor 53, and a temperature detection voltage is converted to a digital value through the multiplexer 51 and the A/D converter 52 and received by the CPU 39.

Connected to the input/output circuit 41 is an EEPROM 54.

The EEPROM 54 comprises the memory means 15 and auxiliary memory means 16, and stores, reads, and rewrites each of the set values.

It should be noted that the reference voltage controlling means 7 for the A/D converter 3 comprises a D/A converter which is equivalent to that of the reference voltage controlling means 6 for the signal amplifier 2, and reversely, it is also possible that the reference voltage controlling means 6 for the signal amplifier 2 comprises a PWM circuit using a smoothing capacitor like that in the reference voltage controlling means 7 for the A/D converter 3.

Figure 6:
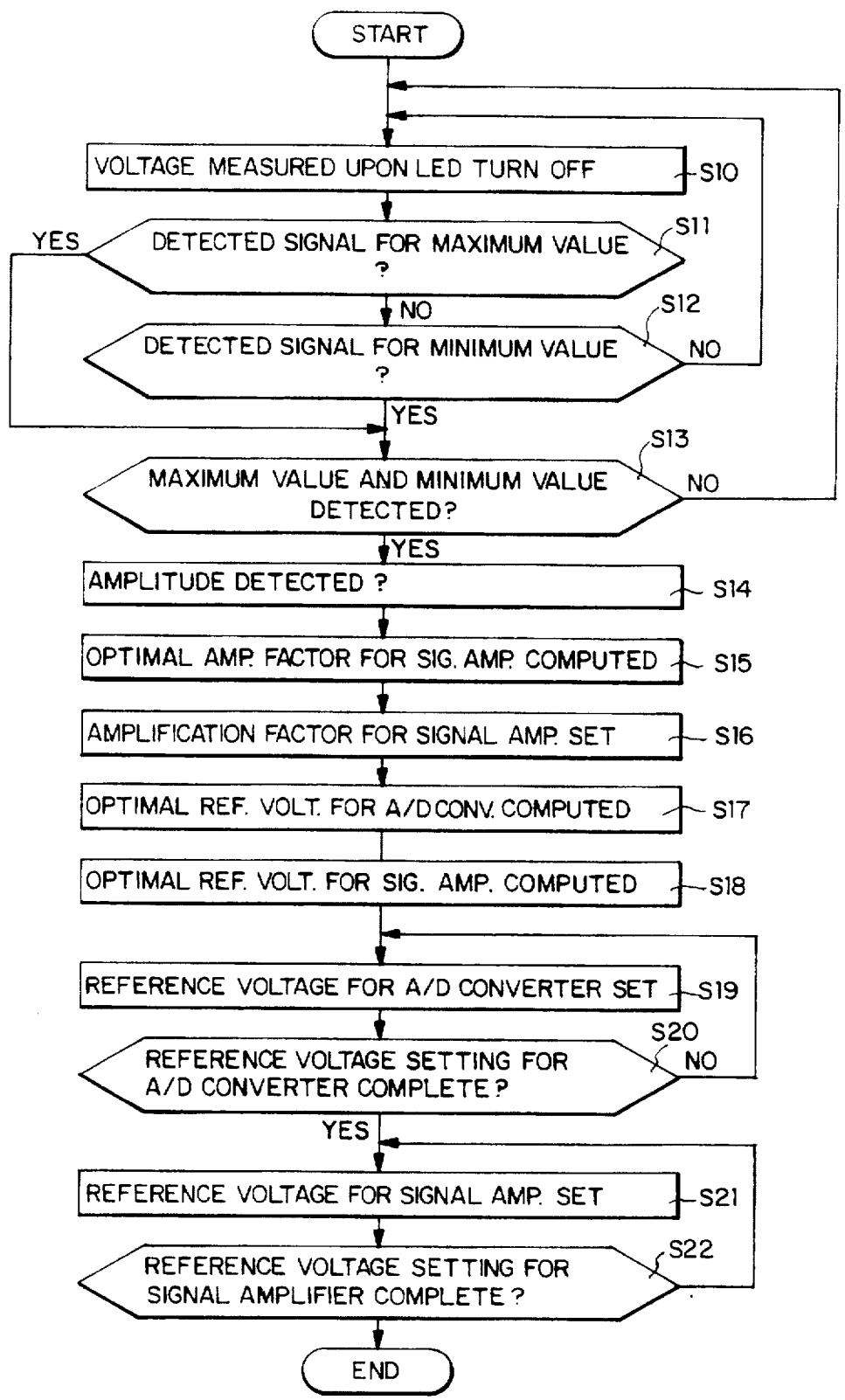
FIG. 6 is a flow chart for explaining operations of the signal correcting apparatus in the encoder according to the present invention.
Figure 7:
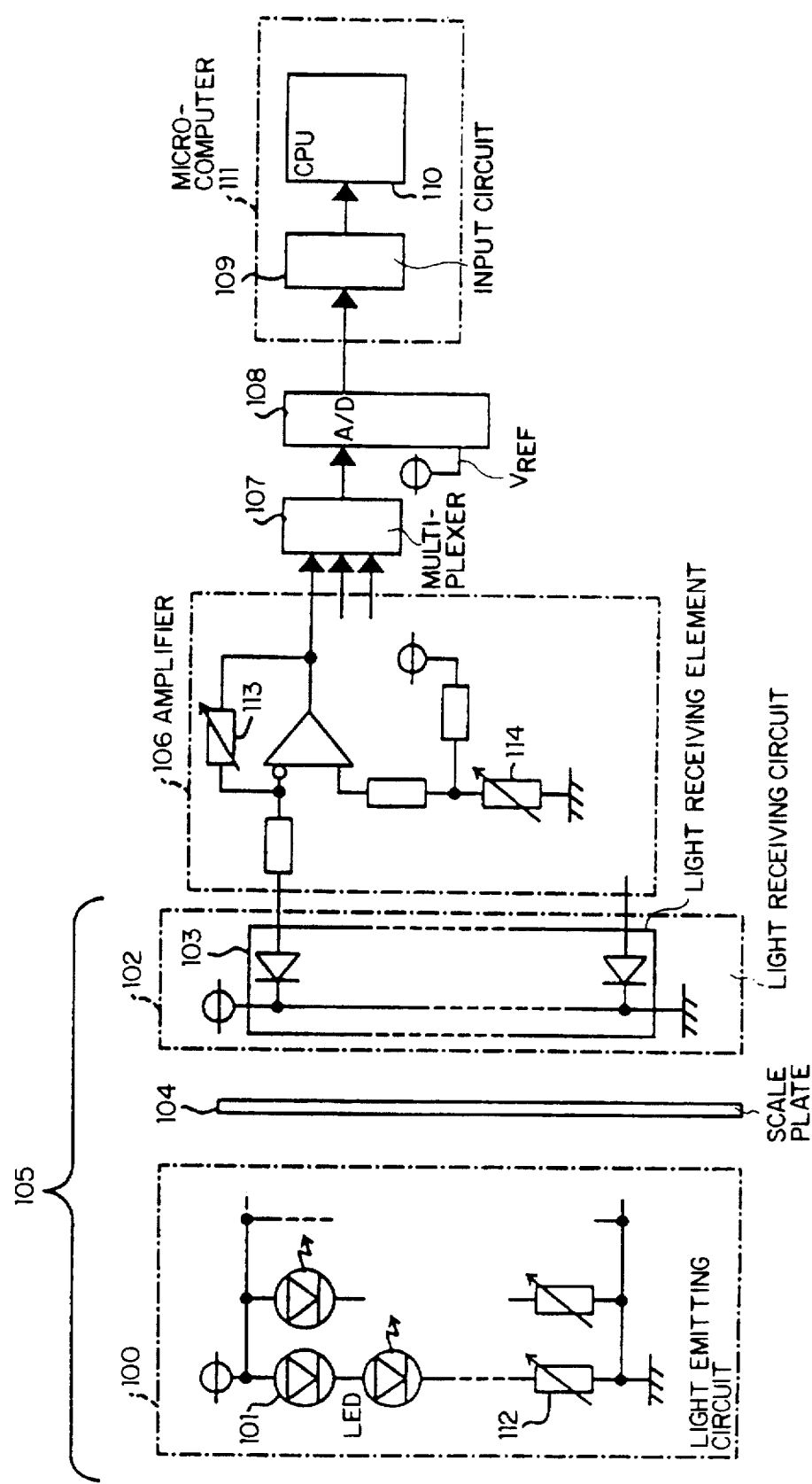
FIG. 7 is a block diagram showing the encoder based on the conventional technology.

Next description is made for operations of the signal correcting apparatus for the encoder according to the present invention with reference to FIG. 6.

At first, a voltage when a light emitting element (LED) 31 is turned off is measured. (Step S10). Next, determination is sequentially made as to whether a signal level of a detected signal (simulated sinusoidal signal) subjected to A/D conversion by the A/D converter 3 is a maximum value or a minimum value (Step S11, Step S12).

In a case where this signal level is a maximum value or a minimum value, it is determined whether both of a maximum value and a minimum value can be detected or not (Step S13), and in a case where both of them are detected, an amplitude value of the detected signal is computed (Step S14).

The amplitude value can be computed as follows. When $A_0$ indicates an amplification factor for the current signal amplifier 2, $VR_0$ indicates a reference voltage for the A/D converter 3, and $V_T$, $V_B$ indicate voltages of a maximum and minimum of the detected signal respectively, data $V_{TD}$, $V_{BD}$ of the maximum value and minimum value after A/D conversion respectively are expressed by the expression below.

Data for a maximum value $V_{TD} = V_T \cdot K/VR_0$

Data for a minimum value $V_{BD} = V_B \cdot K/VR_0$

Wherein, K indicates a dividing number in the A/D converter.

Data for an amplitude $VP_0$ indicating an amplitude value for a signal satisfies the expression of $VP_0 = V_{TD} - V_{BD} = K \cdot (V_T - V_B)/VR_0$.

Next, an optimal amplification factor for the signal amplifier 2 is computed by using the amplitude value (Step S15), and the computed value is outputted for setting an amplification factor for the signal amplifier 2 (Step S16).

Herein, in a case where a target value of an amplitude of the detected signal is $V_{PD}$, an expression for computing an amplification factor to be set (optimal amplification factor) is as follows.

Amplification factor $$A_1 = A_0 \cdot V_{PD}/(V_{TD} - V_{BD})$$

$$A_0 \cdot V_{PD}/VP_0$$

Next, an optimal reference voltage for the A/D converter 3 is computed (Step S17), then an optimal reference voltage for the signal amplifier 2 is computed (Step S18).

Computation of an optimal reference voltage value for the A/D converter 3 can be carried out through the expression as follows.

Optimal reference voltage for the A/D converter 3 $VR_1 = A_1/A_0 \cdot VP_0/V_{PD} \cdot VR_0$, and computation of an optimal reference voltage for the signal amplifier 2 is carried out as follows.

When a voltage value when an LED is turned off is $V_{OF}$ (V), the data for A/D conversion (data on turning off an LED) $V_{OFD}$ satisfies the expression of $$V_{OFD} = V_{OF} \cdot K/VR_0.$$

Assuming a data value for target A/D conversion of a reference voltage value for a signal amplifier 2 is $V_{ST}$ (data), a reference voltage to be set for the signal amplifier 2 (optimal reference voltage) $V_{OFS}$ is as follows.

$$V_{OFS} = VR_1 \cdot V_{ST}/K + VR_0/K \cdot A_1 A_0 \cdot (V_{OFS} - V_{TD})$$

Next, the optimal reference voltage for the A/D converter 3 is outputted and is set to a reference voltage for the A/D converter 3 (Step S19), then whether or not the value has been set to the target set value is checked (Step S20), and the optimal reference voltage for the signal amplifier 2 is outputted and is set to a reference value for the signal amplifier 2 (Step S21), and whether or not the value has been set to the target set value is checked (Step S22).

It should be noted that, in the above description, a case where the present invention was applied to an encoder in an optical system was described, but it is needless to say that the method of correcting signals and the apparatus for the same according to the present invention can also be applicable to an encoder in other systems.

In the method of correcting signals for the encoder according to the present invention, an amplitude for a simulated sinusoidal signal from the signal detecting section is detected, and a reference voltage for the A/D converter, or an amplification factor and a reference voltage for the amplifier is automatically set to an optimal value according to the amplitude, so that an accurate position can be detected regardless of fluctuation of an amplitude in a detected signal.

In the method of correcting signals for the encoder according to another aspect of the present invention, an optimal reference voltage for the A/V converter or an optimal amplification factor and an optimal reference voltage for the amplifier are updated to new values as soon as an amplitude for the simulated sinusoidal signal is detected anew, so that an accurate position can always be detected in association with fluctuation of the detected signal during the operation.

In the method of correcting signals for the encoder according to another aspect of the present invention, a reference voltage for the A/D converter or an amplification factor and a reference voltage for the amplifier are set according to the initial values stored in the memory means until an amplitude of the simulated sinusoidal signal is detected after power is turned ON, and a reference voltage for the A/D converter or an amplification factor and a reference voltage for the amplifier are temporarily and automatically set even immediately after power is turned ON, so that such complicated works as that an amplification factor for the amplifier, a reference voltage for the A/D converter, and a reference voltage for the amplifier are set to optimal values can be omitted on assembly of the device. An accurate position can also be detected even in the initial stage of the operation by using the set values previously stored in the memory means until optimal set values are computed in the initial stage of the operation.

In the method of correcting signals for the encoder according to another aspect of the present invention, a reference voltage for the A/D converter or an amplification factor and a reference voltage for the amplifier are temporarily and automatically set according to the initial values stored in the memory means as well as to the difference values under an amplitude of the sinusoidal signal detected anew until an amplitude of the simulated sinusoidal signal is detected after power is turned ON, so that an accurate position can be detected from a point of time immediately after power is turned ON also in association with fluctuations of the detected signal due to changes with time. In the method of correcting signals for the encoder according to another aspect of the present invention, a reference voltage for the A/D converter or an amplification factor and a reference voltage for the amplifier are corrected according to the temperature compensated value corresponding to the detected temperature at the moment until an amplitude of the simulated sinusoidal signal is detected anew after, for instance, power is turned ON, so that an accurate position can be detected from a point of time immediately after power is turned ON and during the operation regardless of fluctuations of the temperature.

In the method of correcting signals for the encoder according to another aspect of the present invention, a reference voltage for the A/D converter or an amplification factor and a reference voltage for the amplifier are corrected according to the speed compensated value corresponding to the detected speed at the moment until an amplitude of the simulated sinusoidal signal is detected anew after, for instance, power is turned ON, so that an accurate position can be detected from a point of time immediately after power is turned ON and during the operation regardless of fluctuations of the speed.

In the method of correcting signals for the encoder according to another aspect of the present invention, a reference voltage for the A/D converter or an amplification factor and a reference voltage for the amplifier are corrected according to the position compensated value corresponding to the detected position at the moment until an amplitude of the simulated sinusoidal signal is detected anew after, for instance, power is turned ON, so that an accurate position can be detected from a point of time immediately after power is turned ON and during the operation regardless of fluctuations of the position without making any fine adjustment for the signal detecting section required on the assembly.

In the method of correcting signals for the encoder according to another aspect of the present invention, a position for A/D conversion of a next simulated sinusoidal signal is estimated according to the position and the speed, and a reference voltage for the A/D converter or an amplification factor and a reference voltage for the amplifier in next A/D conversion are corrected according to the position compensated value at the estimated position in preparation for next A/D conversion, so that a furthermore accurate position can be detected at each position.

In the signal correcting apparatus for the encoder according to another aspect of the present invention, the amplitude value computing means computes an amplitude of the simulated sinusoidal signal according to a difference value between a maximum value and a minimum value of the simulated sinusoidal signal, the computing means computes an optimal reference voltage for the A/D converter or an optimal amplification factor and an optimal reference voltage for the amplifier for the simulated sinusoidal signals, and the controlling means automatically sets a reference voltage for the A/D converter or an amplification factor and a reference voltage for the amplifier to the optimal values according to the computed values, so that an accurate position can be detected regardless of fluctuations of the amplitude in a detected signal.

In the signal correcting apparatus for the encoder according to another aspect of the present invention, as soon as an amplitude for the simulated sinusoidal signal is detected anew, the computing means computes again an optimal reference voltage for the A/D converter or an optimal amplification factor and an optimal reference voltage for the amplifier, and the values are updated to new ones, so that an accurate position can always be detected also in association with fluctuations of the detected signal during the operation.

In the signal correcting apparatus for the encoder according to another aspect of the present invention, a reference voltage for the A/D converter or an amplification factor and a reference voltage for the amplifier are temporarily and automatically set according to the initial values stored in the memory means until an amplitude of the simulated sinusoidal signal is detected after power is turned ON, so that such complicated works as that an amplification factor for the amplifier, a reference voltage for the A/D converter and a reference voltage for the amplifier are set to optimal values can be omitted on the assembly. An accurate position can also be detected even in the initial stage of the operation by using the set values previously stored in the memory means until optimal set values are computed in the initial stage of the operation.

In the signal correcting apparatus for the encoder according to another aspect of the present invention, a reference voltage for the A/D converter or an amplification factor and a reference voltage for the amplifier are temporarily and automatically set according to the initial values stored in the memory means as well as to a difference value under an amplitude of the simulated sinusoidal signal detected anew until an amplitude of the simulated sinusoidal signal is detected after power is turned ON, so that an accurate position can be detected from a point of time immediately after power is turned ON also in association with fluctuations of the detected signal due to changes with time.

In the signal correcting apparatus for the encoder according to another aspect of the present invention, a reference voltage for the A/D converter or an amplification factor and a reference voltage for the amplifier are corrected according to the temperature compensated value corresponding to the detected temperature at the moment until an amplitude of the simulated sinusoidal signal is detected anew after, for instance, power is turned ON, so that an accurate position can be detected from a point of time immediately after power is turned ON and during the operation regardless of fluctuations of the temperature.

In the signal correcting apparatus for the encoder according to another aspect of the present invention, a reference voltage for the A/D converter or an amplification factor and a reference voltage for the amplifier are corrected according to the speed compensated value corresponding to the detected speed at the moment until an amplitude of the simulated sinusoidal signal is detected anew after, for instance, power is turned ON, so that an accurate position can be detected from a point of time immediately after power is turned ON and during the operation regardless of fluctuations of the speed.

In the signal correcting apparatus for the encoder according to another aspect of the present invention, a reference voltage for the A/D converter or an amplification factor and a reference voltage for the amplifier are corrected according to the position compensated value corresponding to the detected position at the moment until an amplitude of the simulated sinusoidal signal is detected anew after, for instance, power is turned ON, so that an accurate position can be detected from a point of time immediately after power is turned ON and during the operation regardless of fluctuations of the position without making any fine adjustment for the signal detecting section required on the assembly.

In the signal correcting apparatus for the encoder according to another aspect of the present invention, a position for A/D conversion of a next simulated sinusoidal signal is estimated according to the position and the speed, and a reference voltage for the A/D converter or an amplification factor and a reference voltage for the amplifier in next A/D conversion are corrected according to the position compensated value at the estimated position in preparation for next A/D conversion, so that a furthermore accurate position can be detected at each position.

This application is based on Japanese patent application No. HEI 8-77168 filed in the Japanese Patent Office on Mar. 29, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of correcting signals for an encoder by preparing simulated sinusoidal signals by means of movement of a scale member of a signal detecting section, subjecting said simulated sinusoidal signals to A/D conversion, and computing positional data, said method comprising the steps of:

detecting amplitude of said simulated sinusoidal signal from a difference between the maximum value and the minimum value of said simulated sinusoidal signal;

deciding an optimal reference voltage for the A/D converter or an optimal amplification factor and an optimal reference voltage for an amplifier for simulated sinusoidal signals according to this amplitude; and setting a reference voltage for said A/D converter, or an amplification factor and a reference voltage for said amplifier according to these optimal values.

2. A method of correcting signals for an encoder according to claim 1; wherein as soon as an amplitude for said simulated sinusoidal signal is detected anew, an optimal reference voltage for said A/D converter, an optimal amplification factor and an optimal reference voltage for said amplifier are decided again to update the values to new ones.

3. A method of correcting signals for an encoder according to claim 1, further comprising the steps of:

storing a value of the optimal reference voltage for said A/D converter and values of the optimal amplification factor and optimal reference voltage for said amplifier as initial values in a memory means which can store and protect the data; and setting a reference voltage for said A/D converter or an amplification factor and a reference voltage for said amplifier according to the initial values stored in said memory means until an amplitude of said simulated sinusoidal signal is detected, after power is turned ON.

4. A method of correcting signals for an encoder according to claim 3, further comprising the steps of:

storing difference values between an optimal reference voltage for the A/D converter or an optimal amplification factor and an optimal reference voltage for said amplifier each decided according to an amplitude of said simulated sinusoidal signals detected anew and initial values for the factors stored in said memory means in a memory means which can store and protect the data; and setting a reference voltage for said A/D converter or an amplification factor and a reference voltage for said amplifier according to said initial values as well as to the difference values until an amplitude of said simulated sinusoidal signal is detected, after power is turned ON.

5. A method of correcting signals for an encoder according to claim 3, further comprising the steps of:

storing temperature compensated values for an optimal reference voltage for said A/D converter or an optimal amplification factor and an optimal reference voltage for said amplifier according to an amplitude of said simulated sinusoidal signal at each temperature of the encoder in a memory means which can stored and protect the data therein; and correcting the reference voltage for said A/D converter or the amplification factor and the reference voltage for said amplifier according to any of the temperature compensated values corresponding to a detected temperature until an amplitude of the simulated sinusoidal signal is detected anew, for instance, after power is turned ON.

6. A method of correcting signals for an encoder according to claim 3, further comprising the steps of:
storing speed compensated values for an optimal reference voltage for said A/D converter or an optimal amplification factor and an optimal reference voltage for said amplifier according to an amplitude of said simulated sinusoidal signal at each speed of the encoder in a memory means which can store and protect the data therein; and
correcting the reference voltage for said A/D converter or the amplification factor and the reference voltage for said amplifier according to any of the speed compensated values corresponding to a detected speed until an amplitude of said sinusoidal signal is detected anew, for instance, after power is turned ON.

7. A method of correcting signals for an encoder according to claim 3, further comprising the steps of:
storing position compensated values for an optimal reference voltage for said A/D converter or an optimal amplification factor and an optimal reference voltage for said amplifier according to an amplitude of said simulated sinusoidal signal at each position of the encoder in a memory means which can store and protect the data therein; and
correcting the reference voltage for said A/D converter or the amplification factor and the reference voltage for said amplifier according to any of the position compensated values corresponding to a detected position until an amplitude of said simulated sinusoidal signal is detected anew, for instance, after power is turned ON.

8. A method of correcting signals for an encoder according to claim 3, further comprising the steps of: detecting a position and a speed;
estimating a position for A/D conversion of a next simulated sinusoidal signal according to the detected position and speed; and
correcting a reference voltage for said A/D converter an amplification factor and a reference voltage for said amplifier in next A/D conversion according to the position compensated value at the estimated position in preparation for the next A/D conversion.

9. A signal correcting apparatus preparing a simulated sinusoidal signal according to movement of a scale member of a signal detecting section and computing positional data by subjecting the simulated sinusoidal signal to A/D conversion, said device comprising:
an amplitude value computing means for computing an amplitude of said simulated sinusoidal signal according to a difference value between a maximum value and a minimum value of said simulated sinusoidal signal;
a computing means for computing an optimal reference voltage for said A/D converter or an optimal amplification factor and an optimal reference voltage for an amplifier for simulated sinusoidal signals according to the amplitude computed by said amplitude value computing means; and
a control means for setting a reference voltage for said A/D converter or an amplification factor and a reference voltage for said amplifier according to the optimal reference voltage for said A/D converter or the optimal amplification factor and the optimal reference voltage for the amplifier for simulated sinusoidal signals computed by said computing means.

10. A signal correcting apparatus for an encoder according to claim 9, wherein said computing means again computes an optimal reference voltage for said A/D converter, or an optimal amplification factor and an optimal reference voltage for said amplifier as soon as said amplitude value computing means computes an amplitude value and updates these values to new ones.

11. A signal correcting apparatus for an encoder according to claim 9 having a memory means for storing therein an optimal reference value for said A/D converter or an optimal amplification factor and an optimal reference voltage for said amplifier as initial values, and setting a reference voltage for said A/D converter or an amplification factor and a reference voltage for said amplifier according to the initial value stored in said memory means until an amplitude value of said simulated sinusoidal signal is detected after power is turned ON.

12. A signal correcting apparatus according to claim 11 having a memory means, which can store and protect the data therein, for storing therein difference values between the optimal reference voltage for said A/D converter or the optimal amplification factor and the optimal reference value of said amplifier according to the amplitude value of said simulated sinusoidal signal detected anew and the initial values thereof, and setting a reference voltage for said A/D converter or an amplification factor and a reference voltage for said amplifier according to said initial values and the difference values until an amplitude value of said simulated sinusoidal signal is detected after power is turned ON.

13. A signal correcting apparatus for an encoder according to claim 11, having a memory means, which can store and protect the data therein, for storing therein temperature compensated values of an optimal reference voltage for said A/D converter or the optimal amplification factor and the optimal reference voltage for said amplifier according to an amplitude value of said simulated sinusoidal signal at each temperature of the encoder and a temperature detecting means; and correcting a reference voltage for said A/D converter or an amplification factor and a reference voltage for said amplifier according to any of the temperature compensated values corresponding to a temperature detected by said temperature detecting means until an amplitude value of said simulated sinusoidal signal is detected anew, for instance, after power is turned ON.

14. A signal correcting apparatus for an encoder according to claim 11 having a memory means, which can store and protect the data therein, for storing therein speed compensated values of the optimal reference value of said A/D converter or the optimal amplification factor and the optimal reference voltage for said amplifier according to an amplitude value of said simulated sinusoidal signal at each speed of the encoder and a speed computing means; and correcting a reference voltage for said A/D converter or an amplification factor and a reference voltage for said amplifier according to any of the speed compensated values corresponding to a speed detected by said speed computing means until an amplitude value of said sinusoidal signal is detected anew, for instance, after power is turned ON.

15. A signal correcting apparatus for an encoder according to claim 11 having a memory means, which can store and protect the data therein, for storing position compensated values of the optimal reference voltage for said A/D converter or the optimal amplification factor and the optimal reference voltage for said amplifier according to an amplitude value of said simulated sinusoidal signal at each position of the encoder; and correcting a reference voltage for said A/D converter or an amplification factor and a reference voltage for said amplifier according to said initial values as well as to any of said position compensated values corresponding to a detected position of the encoder until an amplitude value of said simulated sinusoidal signal is detected anew, for instance, after power is turned ON.

16. A signal correcting apparatus for an encoder according to claim 11 having a memory means, which can store and protect the data therein, for storing position compensated values of the optimal reference voltage for said A/D converter or the optimal amplification factor and optimal reference voltage for said amplifier according to an amplitude value of said simulated sinusoidal signal at each position of the encoder, and a speed computing means; estimating a position for A/D conversion of a next simulated sinusoidal signal according to a detected position of the encoder as well as to a speed detected by said speed computing means; and correcting a reference voltage for said A/D converter or an amplification factor and a reference voltage for said amplifier in a next A/D conversion according to the position compensated value at the estimated position in preparation for next A/D conversion.

* * * * *